S. K. LUCE.
DEVICE FOR CLEANING SMOKING-PIPES.

No. 191,869. Patented June 12, 1877.

UNITED STATES PATENT OFFICE.

SHUBAEL K. LUCE, OF ATTLEBOROUGH, MASSACHUSETTS.

IMPROVEMENT IN DEVICES FOR CLEANING SMOKING-PIPES.

Specification forming part of Letters Patent No. 191,869, dated June 12, 1877; application filed April 26, 1877.

*To all whom it may concern:*

Be it known that I, SHUBAEL K. LUCE, of Attleborough, in the county of Bristol and State of Massachusetts, have invented a new and valuable Improvement in Device for Cleaning Tobacco-Pipes; and I do hereby declare that the following is a full, clear, and exact description of the construction and operation of the same, reference being had to the annexed drawing, making a part of this specification, and to the letters and figures of reference marked thereon.

Figure 1:
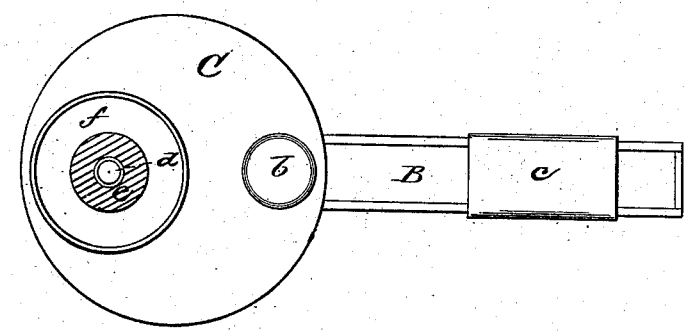
Figure 2:
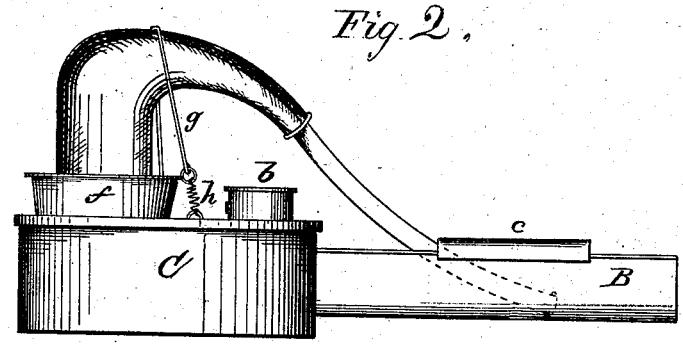
Figure 3:
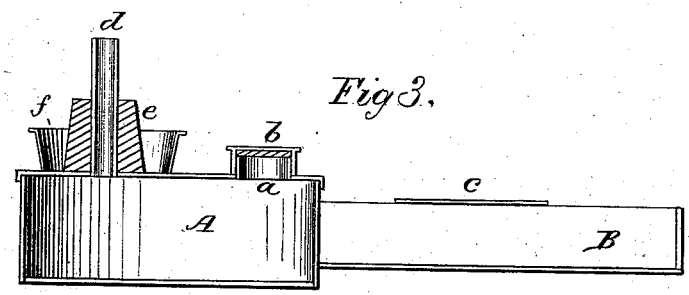

Figure 1 of the drawing is a representation of a plan view of my invention. Fig. 2 is a side elevation, and Fig. 3 is a longitudinal vertical section, of the same.

This invention has relation to devices for cleaning out the bowls and stems of tobacco-pipes; and consists in a cylinder for containing water, said cylinder being designed to be placed over a blaze or heated surface to generate steam, and having an outlet for the escape of the same to the bowl or stem of the pipe.

In the accompanying drawing, A represents a reservoir or cylinder of metal, and of any suitable form for containing water. This cylinder is provided with an opening, $a$, closed by a cap, $b$, through which the cylinder is filled or emptied of its contents. If desired, however, the entire top of the cylinder may be made removable for the purpose of cleaning or repairing, as the necessity may require.

Secured to the cylinder A is a trough, B, to receive the drippings from the pipe-stem, and which also acts as a handle for lifting the cylinder. An adjustable shielding-plate, $c$, is placed over the trough B, and made to slide horizontally thereon to accommodate itself to the different lengths of stems. A tube, $d$, is secured to the cylinder A, and forms an outlet for the steam as it generates. Around the tube $d$ is a packing, $e$, of rubber, cork, or other suitable flexible or elastic material, over which the bowl of the pipe is placed, and around this is a receiver, $f$, to take up the drippings from the bowl. A bail, $g$, passes around the bowl of the pipe to retain it in place, and is connected to suitable springs $h$, so that when the pressure of steam becomes too great the bowl of the pipe may rise and form an escape for the steam between the bowl and packing $e$, said packing being made slightly conical for this purpose, as well as to form a steam-tight connection between the bowl and packing when found necessary.

Should any of the pipe-stems be of such form and length as would not reach the trough B, a rubber tube may be used by connecting it to the end of the stem, one end of the rubber tube resting within the trough B, by which means the drippings are conducted to the trough.

When it is desired to clean the stem independently of the bowl, after the stem has been disconnected therefrom, connection is made between the tube $d$ and pipe-stem by a rubber tube of sufficient length to allow the end of the stem to rest within the trough.

It will be seen that a very novel and effective device for cleaning tobacco-pipes is obtained, and its simple construction renders it portable and not easily gotten out of order.

Having now fully described my invention, what I claim as new, and desire to secure by Letters Patent, is—

1. A device for cleaning tobacco-pipes, consisting of a water-receptacle in which steam is generated, and an outlet for the steam, and a guide for the same, to direct it to the bowl of the pipe or pipe-stem, substantially as and for the purpose set forth.

2. A device for cleaning tobacco-pipes, consisting of a water-reservoir, a trough for receiving the drippings from the pipe, and a packing around the outlet for the steam, substantially as and for the purpose set forth.

3. A device for cleaning tobacco-pipes, consisting of a water-reservoir, a trough for receiving the drippings, a packing around the steam-outlet, and a yielding bail for holding the bowl in position over the steam-outlet, substantially as and for the purpose specified.

In testimony that I claim the above I have hereunto subscribed my name in the presence of two witnesses.

SHUBAEL K. LUCE.

Witnesses:
JOHN DAGGETT,
NANCY M. DAGGETT.